United States Patent
Fujiwara et al.

(10) Patent No.: US 7,352,729 B2
(45) Date of Patent: Apr. 1, 2008

(54) WIRELESS COMMUNICATION SYSTEM FOR MULTI-HOP CONNECTION, SOURCE STATION, RADIO STATION AND PILOT SIGNAL USED THEREIN

(75) Inventors: Atsushi Fujiwara, Yokohama (JP); Shinji Takeda, Yokohama (JP); Hitoshi Yoshino, Yokosuka (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 906 days.

(21) Appl. No.: 10/376,244

(22) Filed: Mar. 3, 2003

(65) Prior Publication Data
US 2003/0165127 A1 Sep. 4, 2003

(30) Foreign Application Priority Data
Mar. 1, 2002 (JP) ............................. 2002-056557

(51) Int. Cl.
*H04Q 7/24* (2006.01)
(52) U.S. Cl. .................. 370/338; 370/332; 370/223; 370/238; 370/252; 370/328
(58) Field of Classification Search ............... 370/252, 370/318, 335, 342, 333, 441, 332, 398, 370, 370/219, 220, 223, 227, 238, 328; 455/60.1, 455/11.1, 126, 277.2, 442, 422.1
See application file for complete search history.

(56) References Cited

U.S. PATENT DOCUMENTS 5,485,486 A * 1/1996 Gilhousen et al. ........... 370/335
5,682,382 A    10/1997 Shepard
5,715,526 A *  2/1998 Weaver et al. .............. 455/126
6,157,619 A * 12/2000 Ozluturk et al. ............ 370/252

(Continued)

FOREIGN PATENT DOCUMENTS

JP    2001-292093    10/2001

(Continued)

OTHER PUBLICATIONS

Ivan Stojmenovic, et al., "Power-Aware Localized Routing in Wireless Networks", IEEE Transactions on Parallel and Distributed Systems, vol. 12, No. 11, XP-001086516, Nov. 2001, pp. 1122-1133.

(Continued)

*Primary Examiner*—Chirag G. Shah
*Assistant Examiner*—Kan Yuen
(74) *Attorney, Agent, or Firm*—Oblon, Spivak, McClelland, Maier & Neustadt, P.C.

(57) ABSTRACT

A destination station in a wireless communication system for a multi-hop connection selects a transmission path having a minimum total of required transmission power values of respective stations on the transmission path among candidates of the transmission path from a source station to the destination station and transmits a pilot signal to the source station and a relay station, the pilot signal including identification information about the respective stations on the selected transmission path and required transmission power values thereof. Thus, the source station and the relay station, which have received this pilot signal, can determine the transmission path having the minimum total of the required transmission power values by use of the identification information included in the received pilot signal.

10 Claims, 8 Drawing Sheets

U.S. PATENT DOCUMENTS

| | | | |
|---|---|---|---|
| 6,347,220 B1* | 2/2002 | Tanaka et al. | 455/277.2 |
| 6,393,276 B1* | 5/2002 | Vanghi | 455/422.1 |
| 6,396,819 B1* | 5/2002 | Fleeter et al. | 370/320 |
| 6,553,018 B1* | 4/2003 | Ichihara | 370/342 |
| 6,587,690 B1* | 7/2003 | Di Huo et al. | 455/446 |
| 6,628,924 B1* | 9/2003 | Miyamoto | 455/69 |
| 6,785,510 B2* | 8/2004 | Larsen | 455/11.1 |
| 6,810,428 B1* | 10/2004 | Larsen et al. | 709/238 |
| 6,847,818 B1* | 1/2005 | Furukawa | 455/442 |
| 6,865,393 B1* | 3/2005 | Baum et al. | 455/452.2 |
| 7,046,640 B2* | 5/2006 | Silva et al. | 370/318 |
| 2001/0036810 A1 | 11/2001 | Larsen | |
| 2002/0012320 A1 | 1/2002 | Ogier et al. | |
| 2002/0018520 A1* | 2/2002 | Eidson | 375/150 |
| 2002/0055367 A1* | 5/2002 | Hamabe et al. | 455/522 |
| 2002/0086694 A1* | 7/2002 | Tran | 455/522 |
| 2002/0159395 A1* | 10/2002 | Nelson et al. | 370/252 |
| 2003/0067904 A1* | 4/2003 | Nagatani et al. | 370/342 |
| 2003/0165127 A1* | 9/2003 | Fujiwara et al. | 370/335 |

FOREIGN PATENT DOCUMENTS

| | | |
|---|---|---|
| JP | 2002-507343 | 3/2002 |
| KR | 2001-13499 | 2/2001 |
| WO | WO 96/19887 | 6/1996 |
| WO | WO 98/56140 | 12/1998 |

OTHER PUBLICATIONS

Suresh Singh, et al., "Power-Aware Routing in Mobile Ad Hoc Networks", MOBICOM '98, Proceedings of the 4th Annual ACM/IEEE International Conference on Mobile Computing and Networking, XP-000850267, Oct. 25, 1998, pp. 181-190.

Madhavi Wunnava Subbarao, "On Optimizing Performance in Mobile Packet Radio Networks", Baltimore, Maryland 1998, 111 pages.

* cited by examiner

| TRANSMISSION STATION ID (SOURCE STATION) | TRANSMISSION POWER VALUE |

| TRANSMISSION STATION ID (SOURCE STATION) | REQUIRED TRANSMISSION POWER VALUE | TRANSMISSION STATION ID (RELAY STATION A) | TRANSMISSION POWER VALUE |

FIG.10A

| TRANSMISSION STATION ID (SOURCE STATION) | REQUIRED TRANSMISSION POWER VALUE | TRANSMISSION STATION ID (RELAY STATION A) | TRANSMISSION POWER VALUE |
|---|---|---|---|

FIG.10B

| TRANSMISSION STATION ID (SOURCE STATION) | REQUIRED TRANSMISSION POWER VALUE | TRANSMISSION STATION ID (RELAY STATION A) | REQUIRED TRANSMISSION POWER VALUE | TRANSMISSION STATION ID (RELAY STATION B) | TRANSMISSION POWER VALUE |
|---|---|---|---|---|---|

FIG.10C

| TRANSMISSION POWER VALUE |
|---|
| TRANSMISSION STATION ID (RELAY STATION Y) |
| REQUIRED TRANSMISSION POWER VALUE |
| TRANSMISSION STATION ID (RELAY STATION X) |
| ⋮ |
| REQUIRED TRANSMISSION POWER VALUE |
| TRANSMISSION STATION ID (RELAY STATION A) |
| REQUIRED TRANSMISSION POWER VALUE |
| TRANSMISSION STATION ID (SOURCE STATION) |

WIRELESS COMMUNICATION SYSTEM FOR MULTI-HOP CONNECTION, SOURCE STATION, RADIO STATION AND PILOT SIGNAL USED THEREIN

CROSS-REFERENCE TO RELATED APPLICATIONS

This application is based upon and claims the benefit of priority from Japanese Patent Application No. 2002-56557 filed Mar. 1, 2002; the entire contents of which are incorporated herein by reference.

BACKGROUND OF THE INVENTION

1. Field of the Invention

The present invention relates to a wireless communication system for a multi-hop connection, in which a signal is transmitted between a source station, a plurality of relay stations and a destination station, and to the source station, relay stations, destination station and a pilot signal, all of which are used therein.

2. Description of Related Art

As the wireless communication system, a system using a single-hop connection method is known. Specifically, in the single-hop connection method, a station to be a source of transmitting a signal (hereinafter referred to as a "source station") establishes a wireless link directly to a station as a destination of the transmission (hereinafter referred to as a "destination station"), thus performing the transmission of the signal. In this single-hope connection method, if a maximum transmission power in the source station is prescribed, large propagation loss and interference noise power make it impossible to establish the wireless link between the source station and the destination station, thereby resulting in lowering of an area coverage.

To the above problem, there is a multi-hop connection method, in which a plurality of relay stations are provided between the source station and the destination station and the signal transmission is relayed by these relay stations. This multi-hop connection method has been applied to TDMA (Time Division Multiple Access) and CSMA (Carrier Sense Multiple Access), because the method is effective in the point of preventing the lowering of the area coverage and of reducing a transmission power.

In the TDMA and CSMA, when selecting an appropriate transmission path among a plurality of transmission paths between the source station and the destination station, criteria related to avoidance of a packet collision and to the reduction of the transmission power were used as main criteria.

However, when the multi-hop connection method is applied to CDMA (Code Division Multiple Access), it is conceivable that, compared to the TDMA and CSMA, new interference noise generated when the relay stations relay the signal is increased. Thus, it is concerned that the increased interference noise becomes a factor that lowers a system capacity.

SUMMARY OF THE INVENTION

One object of the present invention is to provide a wireless communication system for a multi-hop connection, which is capable of suppressing an increase of interference noise generated in relaying of signal transmission by a relay station.

A first aspect of the present invention is a wireless communication system for a multi-hop connection, which performs signal transmission among a source station, a plurality of relay stations and a destination station. In the system, the source station has a transmission unit configured to transmit a pilot signal including identification information of the source station. The relay station therein has: a reception unit configured to receive a pilot signal; a required transmission power total calculation unit configured to specify a transmission path from the source station to the relay station by use of information included in the received pilot signal and calculate a total of required transmission power values of respective stations on the transmission path; a selection unit configured to select a transmission path having a minimum total of the required transmission power values among candidates of the specified transmission path; and a transmission unit configured to transmit a pilot signal including identification information about respective stations on the selected transmission path and required transmission power values thereof. The destination station therein has: a reception unit configured to receive a pilot signal; a required transmission power total calculation unit configured to specify a transmission path from the source station to the destination station by use of information included in the received pilot signal and calculate a total of required transmission power values of respective stations on the transmission path; a selection unit configured to select a transmission path having a minimum total of the required transmission power values among candidates of the specified transmission path; and a transmission unit configured to transmit a pilot signal including identification information about respective stations on the selected transmission path and required transmission power values thereof.

In the present invention, the transmission path having the minimum total of the required transmission power values of the respective stations on the transmission path is selected among the candidates of the transmission path of the signal from the source station to the destination station, and the pilot signal including the identification information about the respective stations on this selected transmission path and the required transmission power values thereof is transmitted to the source station and the relay station. Thus, the destination station and the relay station, which have received the pilot signal, can determine the transmission path having the minimum total of the required transmission power values by use of the identification information included in the received pilot signal in the signal transmission performed threreafter and can transmit the signal with the respective required transmission powers by use of the required transmission power values included in the received pilot signal. As a result, the total of the required transmission power values in transmitting the signal from the source station to the destination station can be minimized, the increase of the interference noise generated in relaying of the signal transmission by the relay station can be suppressed, and the increase of the system capacity and the area coverage can be achieved.

Regarding the transmission path from the source station to the destination station, in order to select the transmission path having the minimum total of the required transmission power values of the respective stations on the transmission path, first, the source station transmits the pilot signal including the identification information of the destination station.

The relay station specifies the transmission path from the source station to the relay station by use of the identification information included in the received pilot signal, selects the transmission path having the minimum total of the required transmission power values among the candidates of the transmission path and transmits the identification information about the respective stations on this transmission path and the required transmission power values thereof. Note that, as the transmission path from the source station to the relay station, a direct transmission path going through no relay station and a transmission path going through one or more relay stations may be possible.

The destination station specifies the transmission path from the source station to the destination station by use of the identification information included in the received pilot signal and selects the transmission path having the minimum total of the required transmission power values among the candidates of the transmission path. In such a manner, a part of processing necessary for the selection of the transmission path is performed also by the relay station, and thus a load of the processing in the destination station is reduced. Note that, also as to the transmission path from the source station to the destination station, the direct transmission path going through no relay station and the transmission path going through one or more relay stations may be possible.

In the first invention, the transmission units transmit a pilot signal at a transmission power prescribed in respective transmission power values, respectively, the reception units have a received SIR measurement unit configured to measure a received SIR obtained when receiving the pilot signal, the required transmission power total calculation units have a power value calculation sub-unit configured to calculate a required transmission power value in an immediately preceding station, from which the pilot signal is transmitted, by use of at least one of a transmission power value of the immediately preceding station, the measured received SIR and a desired received SIR, and a total calculation sub-unit configured to calculate a total of required transmission power values of respective stations on the transmission path by use of required transmission power values included in a received pilot signal and the required transmission power value calculated for the pilot signal by the power value calculation sub-unit.

In the present invention, the relay station calculates a required transmission power value that satisfies the desired received SIR in the immediately preceding station by use of the transmission power value in the immediately preceding station, from which the pilot signal is transmitted, the received SIR measured in the reception of the pilot signal and the desired received SIR, and adds up all of the required transmission power values included in the received pilot signal and the required transmission power value calculated for the pilot signal. Thus, the total of the required transmission power values of the respective station on the transmission path from the source station to the relay station can be calculated. This is similar to the destination station.

A second aspect of the present invention is a source station performing signal transmission with at least one of a relay station and a destination station, the source station comprising: a pilot signal generation unit configured to generate a pilot signal including identification information and transmission power values of the source station; and a transmission unit configured to transmit the pilot signal by use of a power prescribed in the transmission power values.

A third aspect of the present invention is a radio station performing signal transmission with at least one of a source station, a relay station and a destination station, the radio station comprising: a reception unit configured to receive a pilot signal; a required transmission power total calculation unit configured to specify a transmission path from the source station to the relay station by use of information included in the received pilot signal and calculate a total of required transmission power values of respective stations on the transmission path; a selection unit configured to select a transmission path having a minimum total of the required transmission power values among candidates of the specified transmission path; and a transmission unit configured to transmit a pilot signal including identification information about respective stations on the selected transmission path and required transmission power values thereof.

Here, the radio station corresponds to relay station, destination station, and another station for which it is possible to communicate by wireless.

As the transmission path, of the pilot signal, from the source station to the relay station, a direct transmission path going through no relay station and a transmission path going through one or more relay stations may be possible.

A fourth aspect of the present invention is a pilot signal used in a wireless communication system for a multi-hop connection, the system performing signal transmission among a source station, a plurality of relay stations and a destination station. In order to enable selection of a transmission path having a minimum total of required transmission power values of respective stations, the pilot signal includes identification information about the respective stations on the transmission path of the pilot signal and required transmission power values thereof.

The fifth aspect of the present invention is a wireless communication method for a multi-hop connection, which performs signal transmission between a source station, plurality of relay stations and a destination station, when receiving the pilot signal from the source station directly, the relay station measures a received SIR of the pilot signal, calculates a required transmission power value of the source station by use of at least one of a transmission power value of the source station, the measured received SIR and a desired received SIR, generates a pilot signal including identification information and the required transmission power values of the source station, and transmits the pilot signal by use of a power prescribed in the transmission power values of the relay station.

The sixth aspect of the present invention is A wireless communication method for a multi-hop connection, which performs signal transmission between a source station, plurality of relay stations and a destination station, when receiving the pilot signal from the other relay station, the relay station measures a received SIR of the pilot signal, calculates a required transmission power value of the source station by use of at least a transmission power value of the source station, the measured received SIR and a desired received SIR, specifies a transmission path from the source station to the relay station by use of information included in the received pilot signal, calculates a total of required transmission power values of respective stations on the transmission path by use of required transmission power values included in a received pilot signal and the required transmission power value calculated for the pilot signal, selects a transmission path having a minimum total of the required transmission power values among candidates of the specified transmission path, generates a pilot signal including identification information and the required transmission power values of the source station, and transmits the pilot signal by use of a power prescribed in the transmission power values of the relay station.

The seventh aspect of the present invention is a wireless communication method for a multi-hop connection, which performs signal transmission between a source station, plurality of relay stations and a destination station, the destination station measures a received SIR of the pilot signal, calculates a required transmission power value in an immediately preceding station, from which the pilot signal is transmitted, by use of a transmission power value of the immediately preceding station, at least one of the measured received SIR and a desired received SIR, specifies a transmission path from the source station to the destination station by use of information included in the received pilot signal, calculates a total of required transmission power values of respective stations on the transmission path by use of required transmission power values included in a received pilot signal and the required transmission power value calculated for the pilot signal, selects a transmission path having a minimum total of the required transmission power values among candidates of the specified transmission path, transmits a pilot signal including identification information about respective stations on the selected transmission path and required transmission power values thereof.

BRIEF DESCRIPTION OF THE DRAWINGS

FIG. 10A shows one structural example of a pilot signal received by a relay station in the third hop.

FIG. 10B shows one structural example of a pilot signal transmitted by the relay station of FIG. 10A.

FIG. 10C shows one structural example of a pilot signal transmitted by a relay station in a fourth hop and thereafter.

DETAILED DESCRIPTION OF EMBODIMENT

With reference to the drawings, an embodiment of the present invention will be described below.

Figure 1:
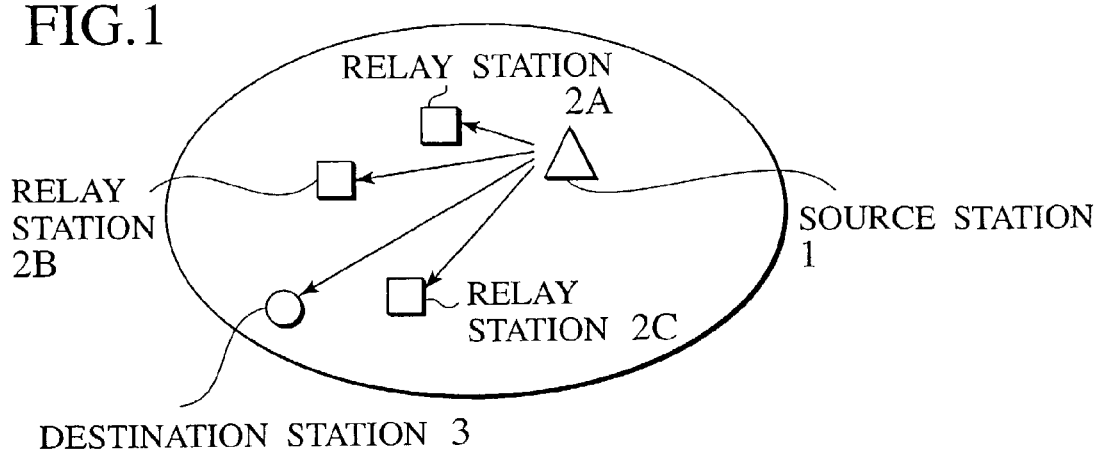
FIG. 1 shows a block diagram of a general schematic constitution of a wireless communication system for a multi-hop connection, according to one embodiment.

FIG. 1 is a block diagram showing a general schematic constitution of a wireless communication system for a multi-hop connection according to one embodiment. The wireless communication system of FIG. 1 is constituted of a source station 1, a plurality of relay stations 2 (which are appropriately denoted as "relay stations 2A, 2B, 2C . . . " for the respective relay stations) and a destination station 3. The respective relay stations 2A, 2B and 2C have basically a similar constitution. As to a transmission path of a signal from the source station 1 to the destination station 3, there are a transmission path in which the signal is directly transmitted from the source station 1 to the destination station 3 and a transmission path in which the signal is transmitted by being relayed through one or more of the relay stations 2 before reaching the destination station 3 from the source station 1.

In the wireless communication system of the present invention, performed is a processing of calculating transmission power values required for the source station 1 and the respective relay stations 2 (hereinafter referred to as "required transmission power values") and of selecting a transmission path having a minimum total of the required transmission power values among candidates of the foregoing transmission path. In order to perform this processing, a transmission of a pilot signal as described later is performed before transmitting an original signal. Hereinafter, detailed description will be made for the processing in the wireless communication system of the present invention.

Figure 2:
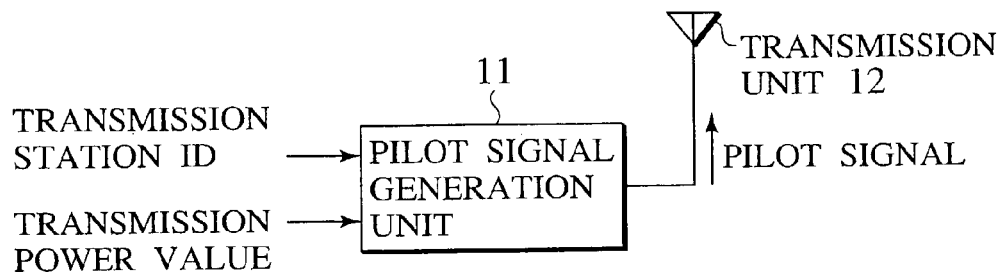
FIG. 2 shows a block diagram of one constitutional example of a source station shown in FIG. 1.

FIG. 2 is a block diagram showing one constitutional example of the source station 1. The source station 1 is constituted at least of a pilot signal generation unit 11 and a transmission unit 12.

Figure 3:
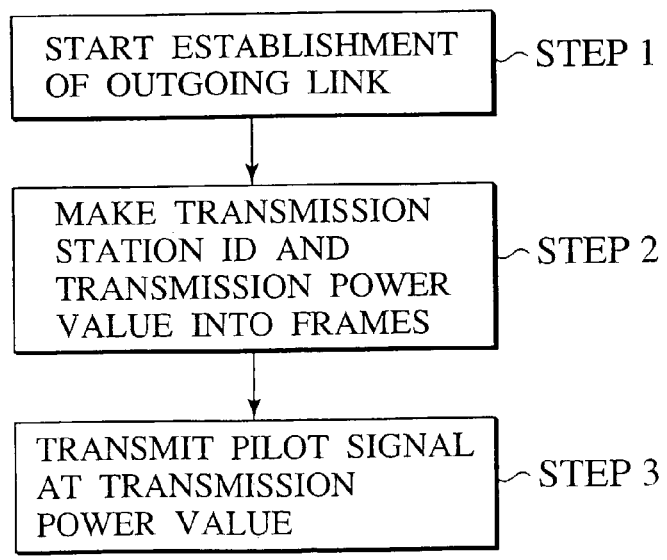
FIG. 3 shows a flowchart of one example of a processing in the source station.

FIG. 3 is a flowchart showing one example of a processing in the source station 1. When a start of an establishment processing of an outgoing wireless link is instructed in Step 1, the pilot signal generation unit 11 generates, in Step 2, a pilot signal by making identification information of the source station 1 (hereinafter, identification information of a station to transmit a signal is appropriately referred to as a "transmission station ID") and a transmission power value thereof into frames, respectively, the transmission power value being previously determined as a power for transmitting the pilot signal. In Step 3, the transmission unit 12 transmits the generated pilot signal by use of a transmission power prescribed by the transmission power value. As to the pilot signal transmitted from the source station 1, there are a case where the pilot signal is received by any of the relay stations 2 and a case where the pilot signal is received directly by the destination station 3.

Figure 4:
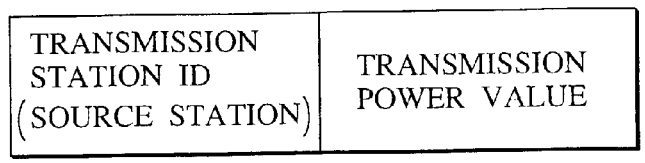
FIG. 4 shows one structural example of a pilot signal transmitted by the source station.

FIG. 4 is a diagram showing one structural example of the pilot signal in this event. The pilot signal includes the transmission station ID (the identification information) of the source station 1 and the transmission power value thereof.

Figure 5:
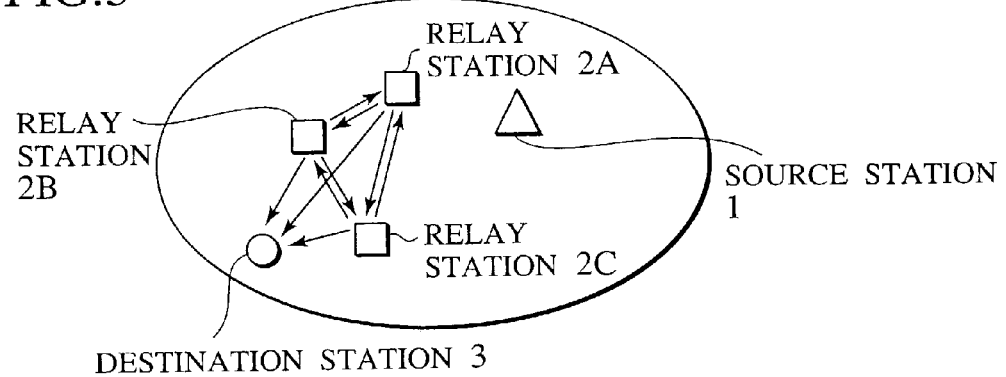
FIG. 5 shows transmission paths when relay stations transmit pilot signals in the wireless communication system.

FIG. 5 is a diagram showing a transmission path when the relay stations 2 transmit pilot signals. As shown in FIG. 5, for example, when the relay station 2A receives the pilot signal, there are a transmission path in which the pilot signal is transmitted directly from the relay station 2A to the destination station 3 and a transmission path in which the pilot signal is transmitted from the relay station 2 to the destination station 3 as going through the other relay station 2B or 2C. It is also similar to the above when the relay station 2B or 2C receives the pilot signal from the source station 1.

Figure 6:
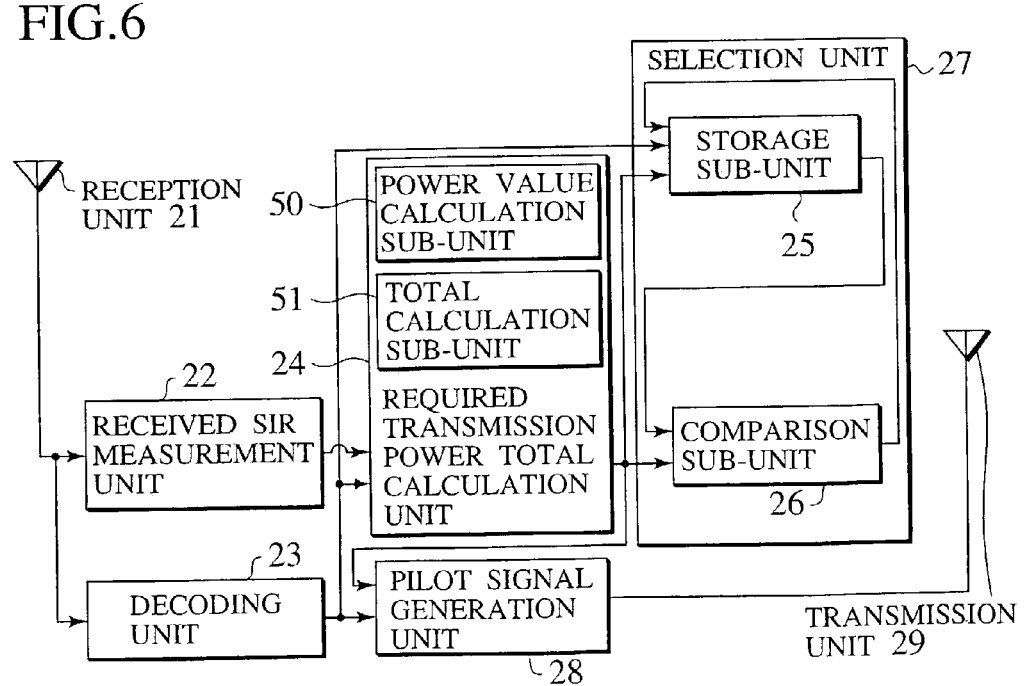
FIG. 6 shows a block diagram of one constitutional example of the relay station shown in FIGS. 1 and 5.

FIG. 6 is a block diagram showing one constitutional example of each of the relay stations 2. The relay station 2 of FIG. 6 is constituted of: a reception unit 21; a received SIR measurement unit 22; a decoding unit 23; a required transmission power total calculation unit 24; a selection unit 27; a pilot signal generation unit 28; and a transmission unit 29.

The selection unit 27 has a storage sub-unit 25 and a comparison sub-unit 26, and the required transmission power total calculation unit 24 has a power value calculation sub-unit 50 and a total calculation sub-unit 51. Hereinafter, functions of the respective units will be described.

Figures 7, 8A, 8B:
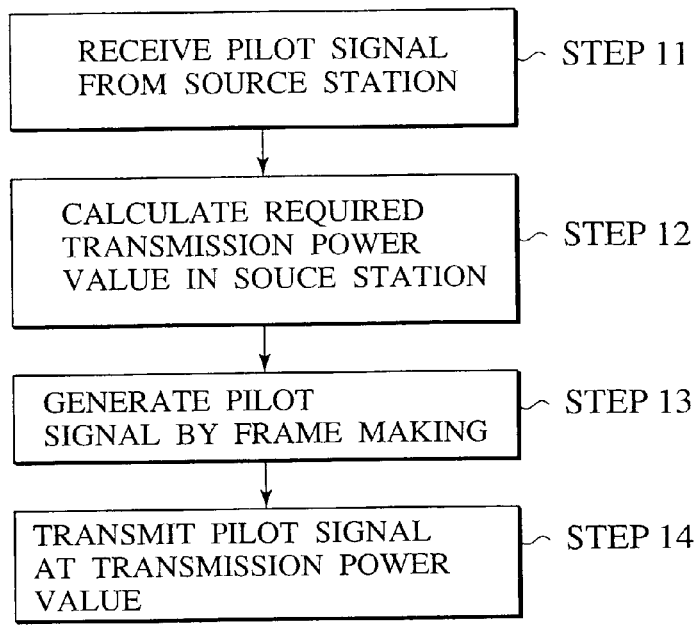
FIG. 7 shows a flowchart of one example of a processing in a relay station in the case of directly receiving a pilot signal from a source station (a second hop).
FIG. 8A shows one structural example of a pilot signal received by a relay station of the second hop.
FIG. 8B shows one structural example of a pilot signal transmitted by the relay station of FIG. 8A.

FIG. 7 is a flowchart showing one example of a processing in the relay station 2 in the case of directly receiving the pilot signal from the source station 1 (a second hop).

In Step 11, the reception unit 21 receives the pilot signal transmitted from the source station 1.

In Step 12, the received SIR measurement unit 22 measures a received SIR (Signal-to-Interference Ratio) at the time of receiving the pilot signal. The decoding unit 23 decodes the identification information and transmission power value of the source station 1, which are included in the received pilot signal. The storage sub-unit 25 stores these identification information and transmission power value. The power value calculation sub-unit 50 of the required transmission power total calculation unit 24 calculates a required transmission power value that satisfies a desired SIR in the source station 1 by use of at least one of the measured received SIR, a desired received SIR and the transmission power value of the source station 1. This calculation is performed in such a manner that, for example, a difference between the measured received SIR and the desired received SIR corresponds to a difference between the transmission power value and the required transmission power value. The storage sub-unit 25 stores this required transmission power value by association with the identification information of the source station 1, which is previously stored.

In Step 13, the pilot signal generation unit 28 reads out the identification information and required transmission power value of the source station 1 from the storage sub-unit 25 and generates a pilot signal by making the above-described information, identification information of the relay station and a transmission power value into frames, the transmission power value being obtained when the relay station transmits a pilot signal.

In Step 14, the transmission unit 29 transmits the generated pilot signal by use of a transmission power prescribed by a transmission power value of the relay station.

FIG. 8A is a diagram showing one structural example of the pilot signal received by the relay station 2 in Step 11. FIG. 8B is a diagram showing one structural example of the pilot signal transmitted by the relay station 2 in Step 14. As shown in FIG. 8B, the transmitted pilot signal includes the transmission station ID of the source station 1, the required transmission power value thereof, a transmission station ID of the relay station 2 and the transmission power value thereof.

Figure 9:
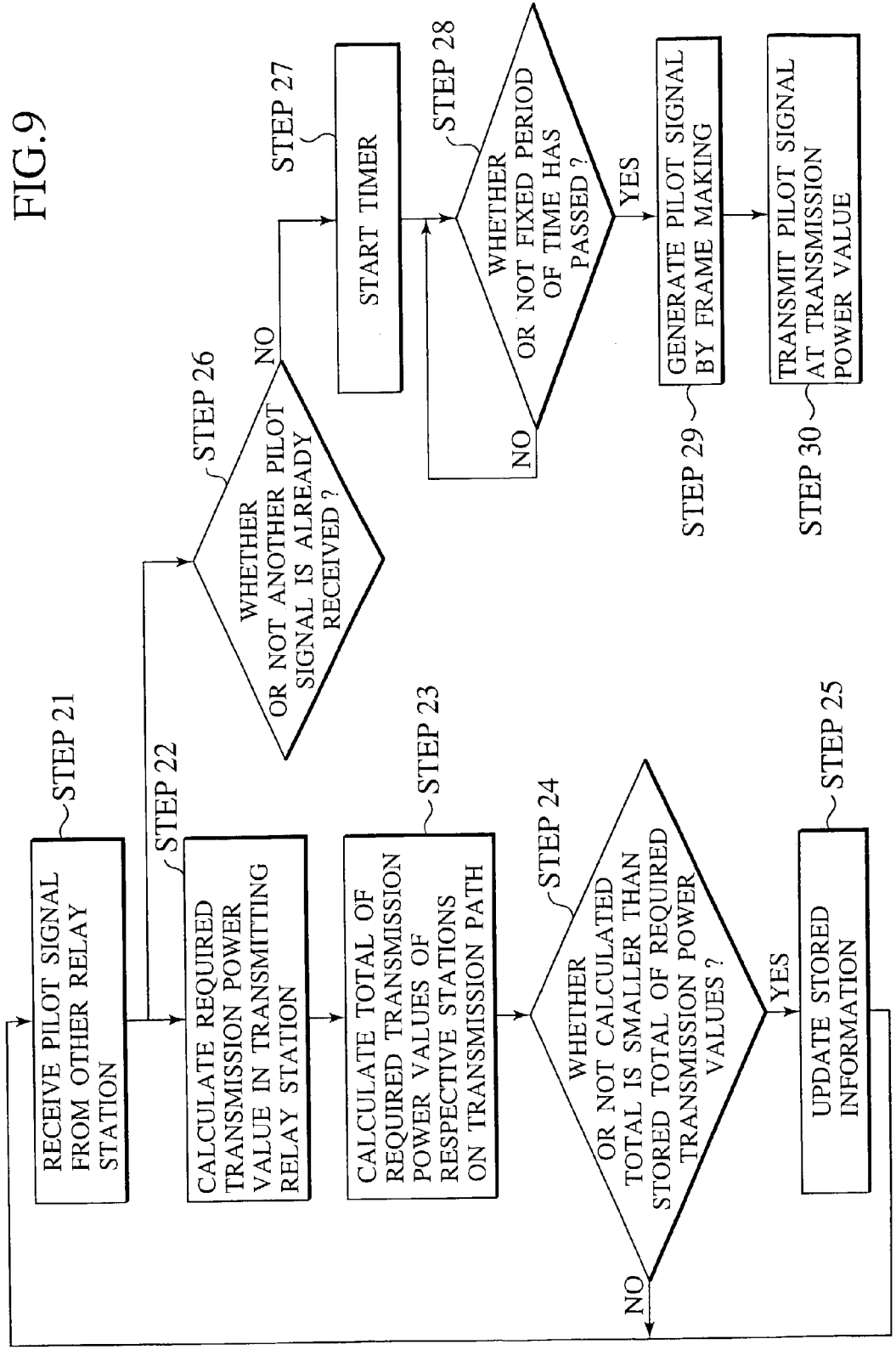
FIG. 9 shows a flowchart of one example of a processing in a relay station in the case of receiving a pilot signal from another relay station (a third hop and thereafter).

FIG. 9 is a flowchart illustrating one example of a processing in the relay station 2 in the case of receiving a pilot signal from the other relay station 2 (a third hop and thereafter).

In Step 21, the reception unit 21 receives a pilot signal transmitted from the other relay station 2.

In Step 22, the received SIR measurement unit 22 measures a received SIR at the time of receiving the pilot signal. The decoding unit 23 decodes all information included in the received pilot signal. This information includes, in the third hop, the identification information and required transmission power value of the source station 1, and identification information and a transmission power value of the immediately preceding relay station 2, from which the pilot signal is transmitted. The power value calculation sub-unit 50 of the required transmission power total calculation unit 24 calculates a required transmission power value that satisfies a desired SIR in the immediately preceding relay station 2 by use of at least one of the measured received SIR, a desired received SIR and the transmission power value of the immediately preceding relay station 2.

In Step 23, the total calculation sub-unit 51 of the required transmission power total calculation unit 24 adds up all of required transmission power values included in the received pilot signal and the required transmission power value calculated for the pilot signal by the power value calculation sub-unit, thus calculating a total of the required transmission power values of the respective stations on the transmission path of the pilot signal.

In Step 24, the comparison sub-unit 26 compares the total of the required transmission power values, which is calculated for the pilot signal by the required transmission power total calculation unit 24, to a total of the required transmission power values stored in the storage sub-unit 25. If the calculated total of the required transmission power values is smaller than the stored total, the processing advances to Step 25, and if not, the processing returns to Step 21.

In Step 25, having found out that the transmission path of the pilot signal is a transmission path having a minimum total of the required transmission power values, the comparison sub-unit 25 updates the identification information and required transmission power values stored in the storage sub-unit 25 by use of all of the identification information and required transmission power values included in the pilot signal and the required transmission power value calculated for the immediately preceding relay station 2, from which the pilot signal is transmitted, by the power value calculation sub-unit 50. Specifically, by use of the identification information and required transmission power values for the respective stations on the transmission path of the pilot signal, the information stored in the storage sub-unit 25 is updated. After the above-described updating, the processing returns to Step 21 and the foregoing processing is repeated.

Meanwhile, in Step 26 immediately after Step 21, the comparison sub-unit 26 determines whether or not another pilot signal has been already received. If no pilot signal has been received, the processing advances to Step 27 and a built-in timer is started. In other words, the built-in timer is started by taking the first time of receiving a pilot signal as a trigger.

In Step 28, by use of the built-in timer, the comparison sub-unit 26 determines whether or not a fixed period of time has passed. Up until the fixed period of time elapses, the above-described processing from Step 21 to Step 25 is repeated, and the processing advances to Step 29 as the fixed period of time elapsed. In such a manner, among the candidates of the transmission path from the source station 1 to the relay station 2, a transmission path having a minimum total of required transmission power values at the elapse of the fixed period of time is selected, thus resulting in a state where the identification information and required transmission power values for all the stations on the transmission path are stored in the storage sub-unit 25.

In Step 29, the pilot signal generation unit 28 reads out the information stored in the storage sub-unit 25, that is, the identification information and required transmission power values for all the stations on the transmission path having the minimum total of the required transmission power values, and generates a pilot signal by making these information, the identification information of the relay station 2 and the transmission power value into frames, the transmission power value being obtained when the relay station 2 transmits the pilot signal. In this event, it is assumed that the transmission power value for the immediately preceding relay station 2, which is included in the received pilot signal, is replaced by the required transmission power value calculated for the immediately preceding relay station 2.

In Step 30, the transmission unit 29 transmits the generated pilot signal by use of the transmission power prescribed by the transmission power value in the relay station 2.

FIG. 10A is a diagram showing one structural example of the pilot signal received by the relay station 2 in Step 21. FIG. 10B is a diagram showing one structural example of the pilot signal transmitted by the relay station 2 at the third hop in Step 28. FIG. 10C is a diagram showing one structural example of the pilot signal transmitted by the relay station 2 at the fourth hop and thereafter in Step 28. As shown in FIG. 10C, the transmitted pilot signal includes: the transmission station ID (identification information) of the source station 1 and the required transmission power value thereof; transmission station IDs for all the relay stations 2 on the transmission path, in which the pilot signal is transmitted, and required transmission power values thereof; and the transmission station ID of the relay station 2 and the transmission power value thereof.

Figure 11:
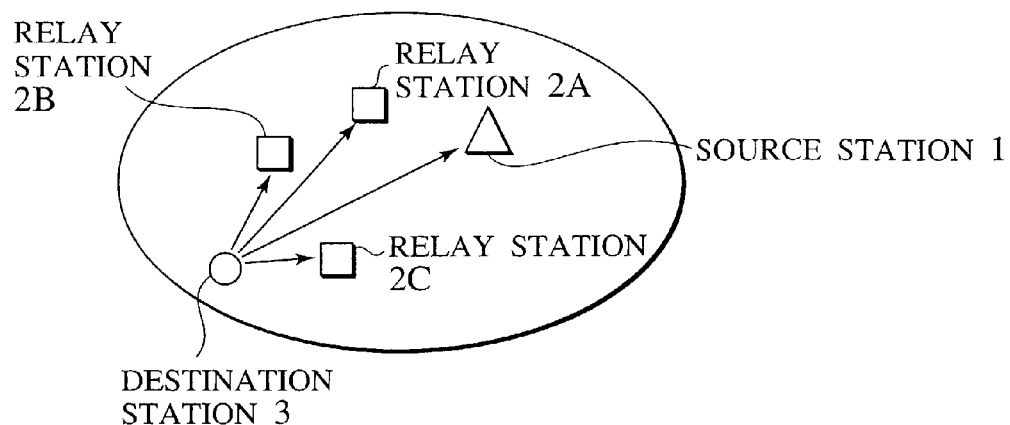
FIG. 11 shows a transmission path when a destination station transmits a pilot signal in the wireless communication system.

FIG. 11 is a diagram showing a transmission path when the destination station 3 transmits a pilot signal. There are a transmission path in which the signal is transmitted from the destination station 3 to any of the relay stations 2 and a transmission path in which the signal is transmitted directly to the source station 1 from the destination station 3.

Figure 12:
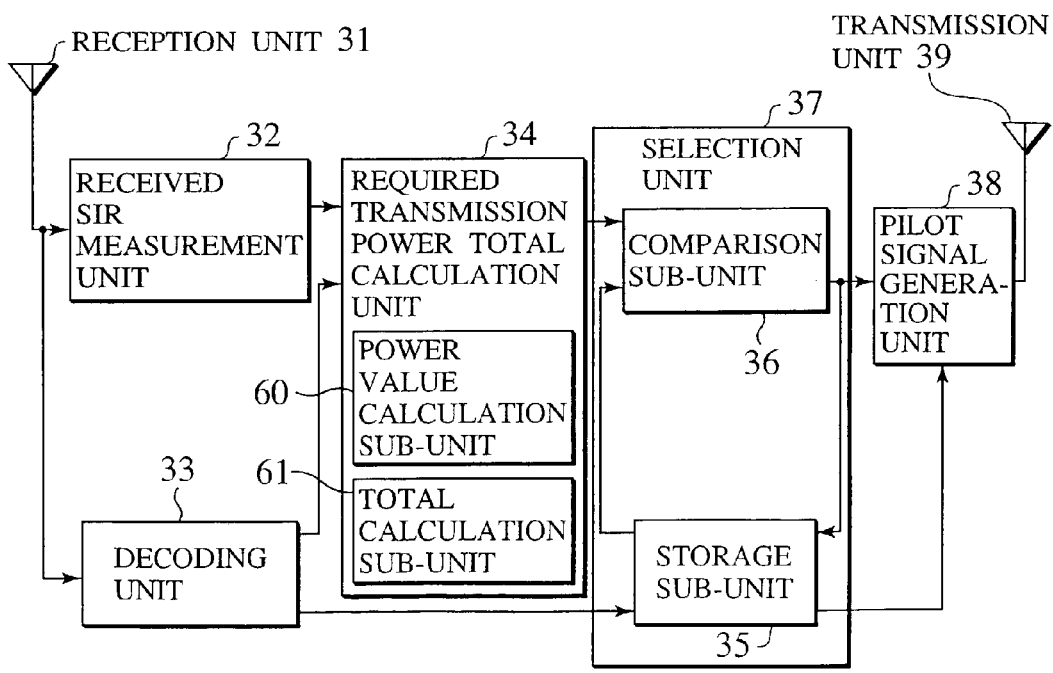
FIG. 12 shows a block diagram of one structural example of the destination station.

FIG. 12 is a block diagram showing one constitutional example of the destination station 3. The destination station of FIG. 12 is constituted of a reception unit 31, a received SIR measurement unit 32, a decoding unit 33, a required transmission power total calculation unit 34, a selection unit 37, a pilot signal generation unit 38 and a transmission unit 39. The selection unit 37 has a storage sub-unit 35 and a comparison sub-unit 36, and the required transmission power total calculation unit 34 has a power value calculation sub-unit 60 and a total calculation sub-unit 61. Hereinafter, functions of the respective units will be described.

Figure 13:
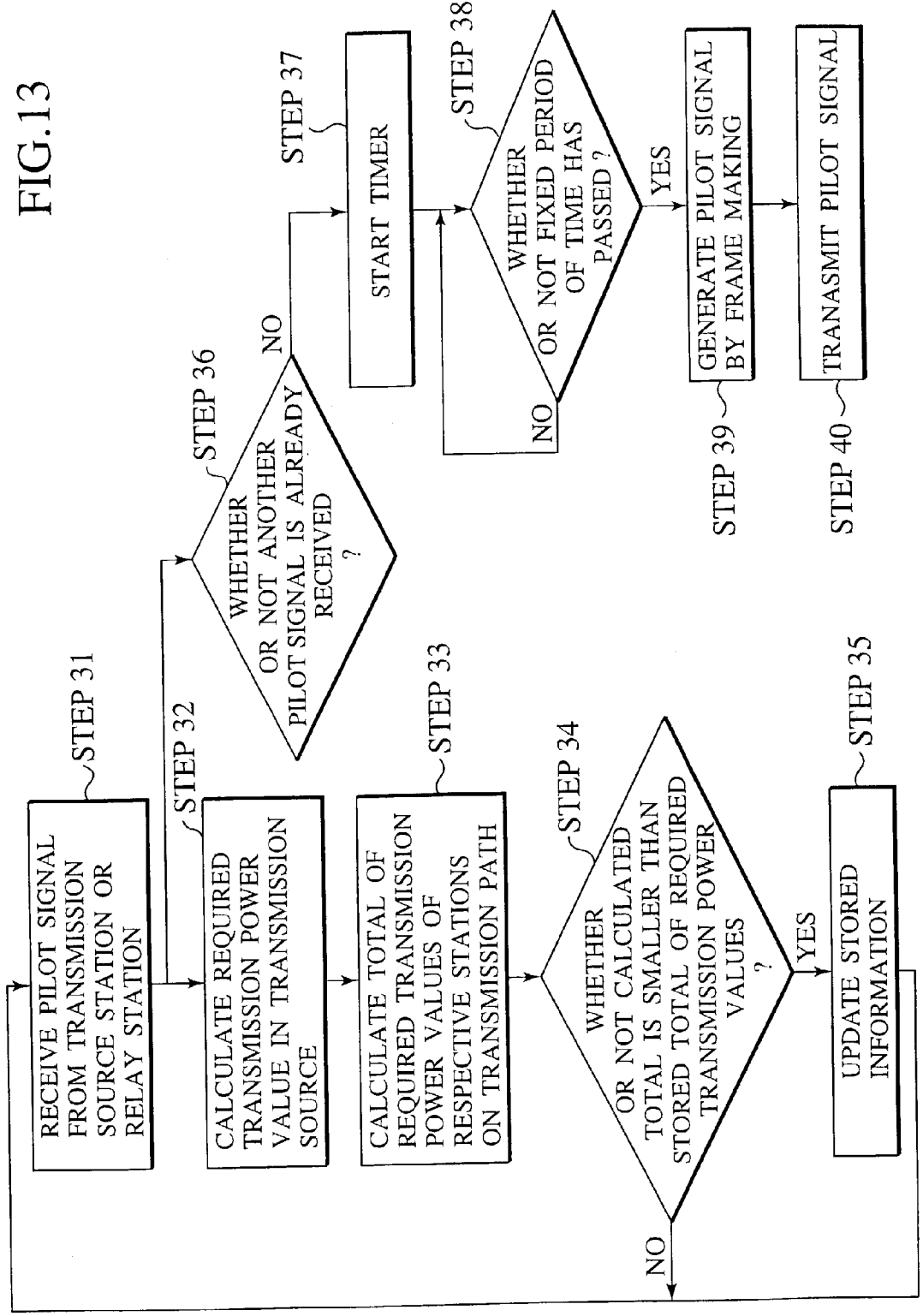
FIG. 13 shows a flowchart of one example of a processing in the destination station at the time of receiving a pilot signal.

FIG. 13 is a flowchart illustrating one example of a processing in the destination station 3 when receiving a pilot signal.

In Step 31, the reception unit 31 receives a pilot signal transmitted from the source station 1 or the relay station 2.

In Step 32, the received SIR measurement unit 32 measures a received SIR at the time of receiving the pilot signal. The decoding unit 33 decodes all information included in the received pilot signal. In this information, as an example, included are: the identification information of the source station 1 and the required transmission power value thereof; and the identification information for the respective relay stations 2 on the transmission path, in which the pilot signal is transmitted, and the required transmission power values thereof. Note that, as to the immediately preceding relay station 2 that has become the transmission source, the transmission power value is included, instead of the required transmission power value. The power value calculation sub-unit 60 of the required transmission power total calculation unit 34 calculates a required transmission power value that satisfies a desired SIR in the immediately preceding relay station 2 by use of at least one of the measured received SIR, a desired received SIR and the transmission power value of the immediately preceding relay station 2.

In Step 33, the total calculation sub-unit 61 of the required transmission power total calculation unit 34 adds up all of required transmission power values included in the received pilot signal and the required transmission power value calculated for the pilot signal by the power value calculation sub-unit, thus calculating a total of the required transmission power values of the respective stations on the transmission path of the pilot signal.

In Step 34, the comparison sub-unit 36 compares the total of the required transmission power values, which is calculated for the pilot signal by the required transmission power total calculation unit 34, to a total of the required transmission power values stored in the storage sub-unit 35. If the calculated total of the required transmission power values is smaller than the stored total, the processing advances to Step 35, and if not, the processing returns to Step 31.

In Step 35, having found out that the transmission path of the pilot signal is a transmission path having a minimum total of the required transmission power values, the comparison sub-unit 36 updates the identification information and required transmission power values stored in the storage sub-unit 35 by use of all of the identification information and required transmission power values included in the pilot signal and the required transmission power value calculated for the immediately preceding relay station, from which the pilot signal is transmitted, by the power value calculation sub-unit 60. Specifically, by use of the identification information and required transmission power values for the respective stations on the transmission path of the pilot signal, the information stored in the storage sub-unit 35 is updated. After the above-described updating, the processing returns to Step 31 and the foregoing processing is repeated.

Meanwhile, in Step 36 immediately after Step 31, the comparison sub-unit 36 determines whether or not another pilot signal has been already received. If no pilot signal has been received, the processing advances to Step 37 and a built-in timer is started. In other words, the built-in timer is started by taking the first time of receiving a pilot signal as a trigger.

In Step 38, by use of the built-in timer, the comparison sub-unit 36 determines whether or not a fixed period of time has passed. Up until the fixed period of time elapses, the above-described processing from Step 31 to Step 35 is repeated, and the processing advances to Step 39 as the fixed period of time elapsed. In such a manner, among the candidates of the transmission path from the source station 1 to the destination station 3, a transmission path having a minimum total of required transmission power values at the elapse of the fixed period of time is selected, thus resulting in a state where the identification information and required transmission power values for all the stations on the transmission path are stored in the storage sub-unit 35.

In Step 39, the pilot signal generation unit 38 reads out the information stored in the storage sub-unit 35, that is, the identification information and required transmission power values for all the stations on the transmission path having the minimum total of the required transmission power values, and generates a pilot signal by making these information into frames.

In Step 40, the transmission unit 39 transmits the generated pilot signal.

The pilot signal thus transmitted is received by the source station 1 and the respective relay stations 2. This pilot signal may be received by the source station 1 after going through any of the relay stations 2 or may be received directly from the destination station 3. Thereafter, the source station 1 and the respective relay stations 2 determine the transmission path having the minimum total of the required transmission power values by use of the identification information included in the received pilot signal and transmits the signal by use of the transmission power prescribed by the required transmission power value included in the received pilot signal.

Therefore, according to the embodiment, the destination station 3 selects the transmission path having the minimum total of the required transmission power values of the respective stations on the transmission path among the candidates of the transmission path from the source station 1 to the destination station 3 and transmits the pilot signal to the source station 1 and the relay station 2, the pilot signal including the identification information about the respective stations on the selected transmission path and the required transmission power values thereof. Thus, in transmitting signals thereafter, the source station 1 and the relay station 2, which have received this pilot signal, can determine the transmission path having the minimum total of the required transmission power values by use of the identification information included in the received pilot signal and can also transmit the signal at the transmission power prescribed by the required transmission power value included in the received pilot signal. In such a manner, the total of the required transmission power values in transmitting the signal from the source station 1 to the destination station 3 can be minimized, the increase of the interference noise generated in relaying of the signal transmission by the relay station 2 can be suppressed, and the increase of the system capacity and the area coverage can be achieved.

Note that, in the embodiment, the power value calculation sub-unit 50 of the required transmission power total calculation unit 24 in the relay station 2 and the power value calculation sub-unit 60 of the required transmission power total calculation unit 34 in the destination station 3 calculate the required transmission power value in the immediately preceding station, from which the pilot signal is transmitted, by use of the transmission power values included in the received pilot signal, respectively. However, there is no limitation placed in this regard. As another embodiment, storage units that store transmission power values in other stations may be provided in the relay station 2 and the destination station 3, and in calculating a required transmission power value in a immediately preceding station, the transmission power values stored in the storage units may be used.

Figure 14:
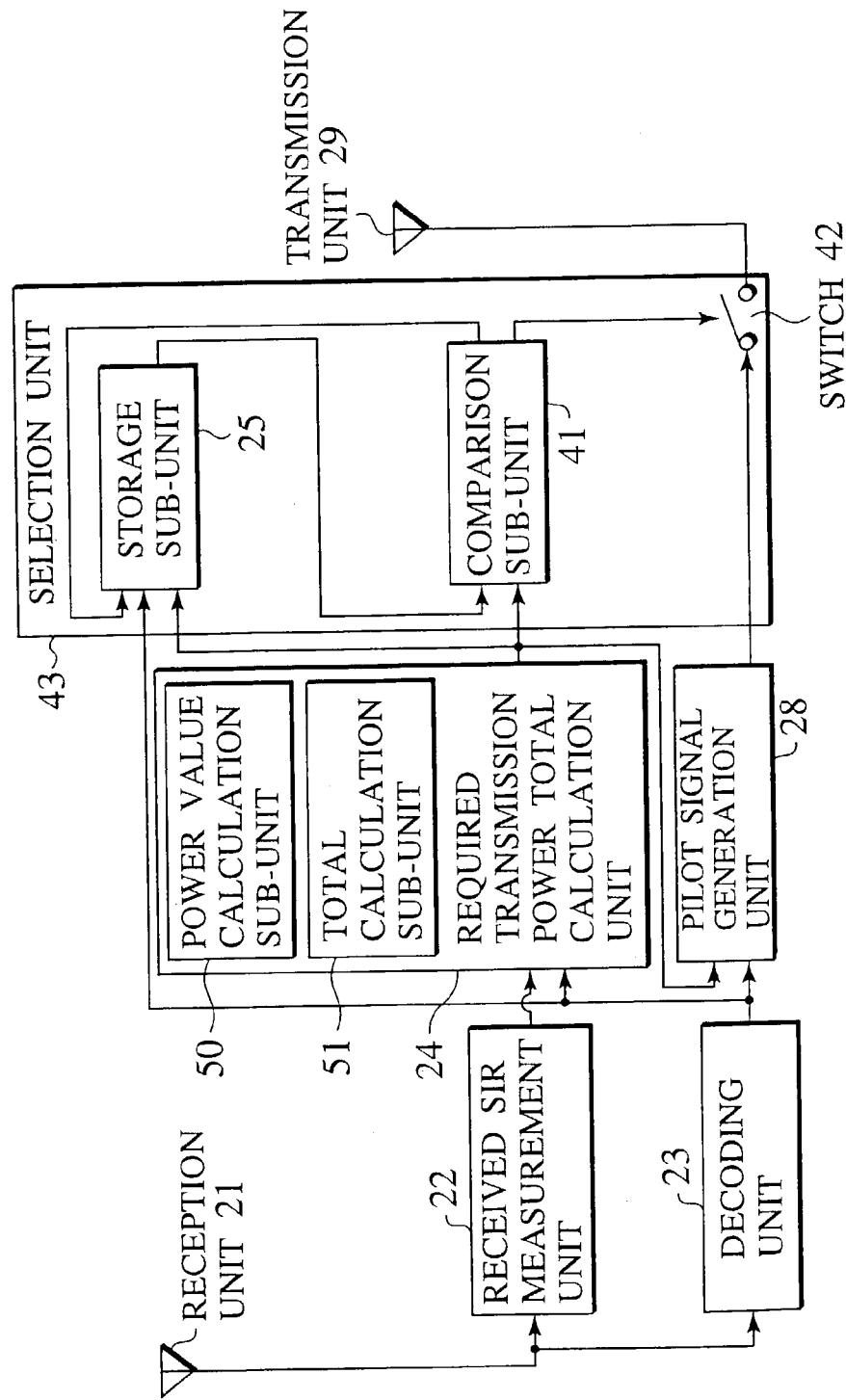
FIG. 14 shows a block diagram of another constitutional example of a relay station.

Moreover, though the relay station 2 in the embodiment has the constitution shown in FIG. 6, a constitution shown in FIG. 14 may be also adopted. The relay station 2 shown in FIG. 14 has a constitution using a selection unit 43 that has a storage sub-unit 25, a comparison sub-unit 41 and a switch 42, instead of the selection unit 27 of FIG. 6. Note that the other constituent components that are the same as those of FIG. 6 are denoted by the same reference numerals.

In the constitution shown in FIG. 14, the pilot signal generation unit 28 generates a pilot signal by making into frames the following: all the identification information and required transmission power values included in the received pilot signal; the required transmission power value calculated by the power value calculation sub-unit 50 of the required transmission power total calculation unit 24; and the identification information about the relay station and the transmission power value thereof.

The comparison sub-unit 41 compares the total of the required transmission power values calculated for the received pilot signal by of the required transmission power total calculation unit 24 to the total of the required transmission power values stored in the storage sub-unit 25, updates the identification information and required transmission power values stored in the storage sub-unit 25 by use of the identification information and required transmission power values for the respective stations, which are included in the pilot signal, and the required transmission power value calculated by the power value calculation sub-unit 50 only if the calculated total of the required transmission power values is smaller than the stored total, and transmits the pilot signal generated by the pilot signal generation unit 28 to the transmission unit 29 by turning on the switch 42.

Unlike the relay station of FIG. 6, the relay station 2 of FIG. 14 is not the one selecting the transmission path having the minimum total of the required transmission power values when receiving the pilot signal in the fixed period of time. However, by transmitting the pilot signal as described above, the destination station 3 can provide information for selecting the transmission path having the minimum total of the required transmission power values. Moreover, by successively processing the pilot signal at each time of the reception thereof, a transmission delay of the pilot signal can be reduced.

Moreover, the wireless communication system according to the embodiment can be applied to incoming and outgoing links of a cellular communication system such as TDMA, CSMA, CDMA and the like. For example, in the case of the application thereof to the outgoing link, the source station 1 corresponds to a base station, the destination station 3 corresponds to a mobile station, and the relay station 2 corresponds to a mobile station or a station dedicated to relay. In the case of the application thereof to the incoming link, the source station 1 corresponds to the mobile station and the destination station 3 corresponds to the base station.

Moreover, in the embodiment, the pilot signal is transmitted including the identification information of the respective stations, the required transmission power values thereof and the like. However, a signal including control information besides the above information may be used as the pilot signal.

What is claimed is:

1. A wireless communication system for a multi-hop connection, which performs signal transmission between a source station, a plurality of relay stations and a destination station, comprising:

the source station, including
a transmission unit configured to transmit a pilot signal including identification information of the source station;

a relay station of the plurality of relay stations including:
a reception unit configured to receive a received pilot signal,
a required transmission power total calculation unit configured to specify a transmission path from the source station to the relay station by use of information included in the received pilot signal and calculate a total of required transmission power values of respective stations on the transmission path,
a selection unit configured to select a transmission path having a minimum total of the required transmission power values among candidates of the specified transmission path, and
a transmission unit configured to transmit a relay pilot signal including identification information about respective stations on the selected transmission path and required transmission power values thereof; and the destination station including a reception unit configured to receive at least one of the received pilot signal and the relay pilot signal, a required transmission power total calculation unit configured to specify a transmission path from the source station to the destination station by use of information included in the at least one of the received pilot signal and the relay pilot signal and calculate a total of required transmission power values of respective stations on the transmission path, a selection unit configured to select a transmission path having a minimum total of the required transmission power values among candidates of the specified transmission path, and a transmission unit configured to transmit a return pilot signal including identification information about respective stations on the selected transmission path and required transmission power values thereof, wherein the transmission unit of the relay station transmits a relay pilot signal at a transmission power prescribed in respective transmission power values, respectively, the reception unit includes a received SIR measurement unit configured to measure a received SIR obtained when receiving the received pilot signal, the required transmission power total calculation units include a power value calculation sub-unit configured to calculate a required transmission power value in an immediately preceding station, from which the at least one of the received pilot signal and the relay pilot signal is transmitted, by use of at least one of a transmission power value of the immediately preceding station, the measured received SIR and a desired received SIR, and a total calculation sub-unit configured to calculate a total of required transmission power values of respective stations on the transmission path by use of required transmission power values included in the at least one of the received pilot signal and the relay pilot signal and the required transmission power value calculated by the power value calculation sub-unit.

2. The wireless communication system for a multi-hop connection of claim 1, wherein the respective reception units receive the at least one of the received pilot signal and the relay pilot signal for a fixed period of time, and the selection units select a transmission path having a minimum total of required transmission power values among candidates of the transmission path for the at least one of the received pilot signal and the relay pilot signal received in this fixed period of time.

3. A radio station performing signal transmission with at least one of a source station, a relay station and a destination station, the radio station comprising:

a reception unit configured to receive a received pilot signal;

a required transmission power total calculation unit configured to specify a transmission path from the source station to the relay station by use of information included in the received pilot signal and calculate a total of required transmission power values of respective stations on the transmission path;

a selection unit configured to select a transmission path having a minimum total of the required transmission power values among candidates of the specified transmission path;

a transmission unit configured to transmit a relay pilot signal including identification information about respective stations on the selected transmission path and required transmission power values thereof; and a received SIR measurement unit configured to measure a received SIR obtained when receiving the received pilot signal, wherein the transmission unit transmits the relay pilot signal at a transmission power prescribed in a transmission power value, the required transmission power total calculation unit includes a power value calculation sub-unit configured to calculate a required transmission power value in an immediately preceding station, from which the received pilot signal is transmitted, by use of at least one of a transmission power value of the immediately preceding station, the measured received SIR and a desired received SIR, and a total calculation sub-unit configured to calculate a total of required transmission power values of respective stations on the transmission path by use of required transmission power values included in the received pilot signal and the required transmission power value calculated by the power value calculation sub-unit.

4. The radio station of claim 3, wherein the power value calculation sub-unit uses a transmission power value included in the received pilot signal.

5. The radio station of claim 4, wherein
the transmission unit transmits the relay pilot signal including a transmission power value of the radio station.

6. The radio station of claim 3, wherein the power calculation sub-unit uses previously stored transmission power values for other stations.

7. A radio station performing signal transmission with at least one of a source station, a relay station and a destination station, the radio station comprising:

a reception unit configured to receive a received pilot signal;

a required transmission power total calculation unit configured to specify a transmission path from the source station to the relay station by use of information included in the received pilot signal and calculate a total of required transmission power values of respective stations on the transmission path;

a selection unit configured to select a transmission path having a minimum total of the required transmission power values among candidates of the specified transmission path;

a transmission unit configured to transmit a relay pilot signal including identification information about respective stations on the selected transmission path and required transmission power values thereof; and the selection unit includes a storage sub-unit configured to store identification information and required transmission power values; and a comparison sub-unit configured to compare a total of required transmission power values calculated for the received pilot signal by the required transmission power total calculation unit of the relay station to a total of the required transmission power values stored in the storage sub-unit, and if the total of the required transmission power values calculated for the received pilot signal is smaller, update the identification information and the required transmission power values, which are stored in the storage sub-unit, by use of identification information about respective stations on a transmission path of the received pilot signal and required transmission power values thereof.

8. The radio station of any one of claims 3 to 7, wherein
the reception unit receives the received pilot signal for a fixed period of time and
the selection unit selects a transmission path having a minimum total of required transmission power values among candidates of the transmission path for the received pilot signal received in this fixed period of time.

9. The wireless communication system for a multi-hop connection of claim 1, wherein the power value calculation sub-unit is configured to calculate the required transmission power value in the immediately preceding station by use of the transmission power value of the immediately preceding station, the measured received STIR and the desired received STIR.

10. The radio station of claim 3, wherein the power value calculation sub-unit is configured to calculate the required transmission power value in the immediately preceding station by use of the transmission power value of the immediately preceding station, the measured received STIR and the desired received SIR.

* * * * *